March 25, 1958  J. C. ABBEY  2,828,146
COUPLING WITH SLIDING SEAL PLATES
Filed March 8, 1952  2 Sheets-Sheet 1
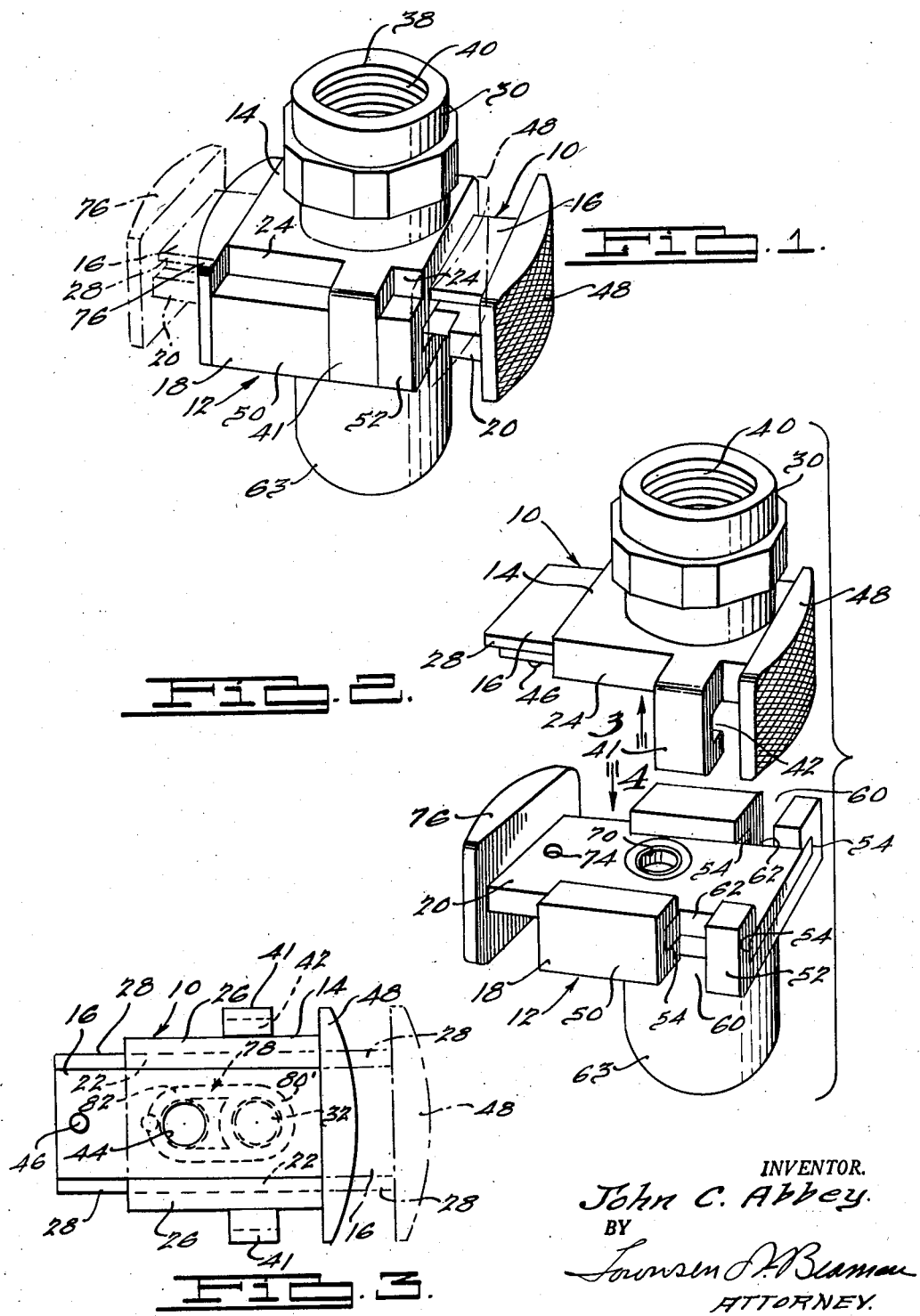
INVENTOR.
John C. Abbey
BY
ATTORNEY.

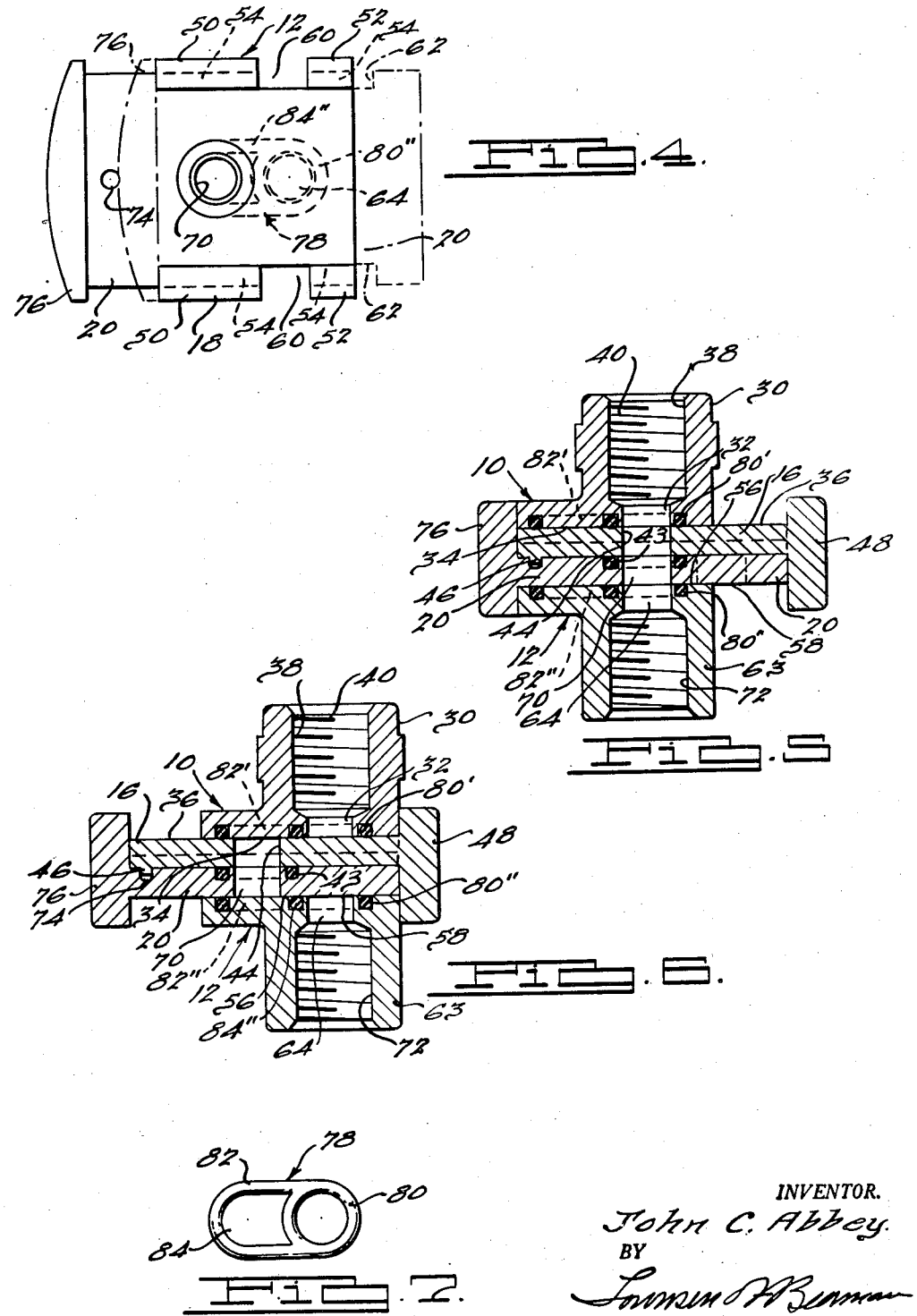

United States Patent Office 2,828,146
Patented Mar. 25, 1958

2,828,146
COUPLING WITH SLIDING SEAL PLATES
John C. Abbey, Parma, Mich., assignor to Aeroquip Corporation, Jackson, Mich., a corporation of Michigan
Application October 8, 1952, Serial No. 313,724
1 Claim. (Cl. 284—4)

This invention relates to valve constructions of the kind which comprise a pair of coupling body elements having flat interengageable surfaces with openings therein which are capable of being brought into or out of register with one another by producing relative displacement of the coupling body elements to slide one surface with respect to the other surface, whereby the opening in one body element is caused to move across the other opening in the other body element either for the purpose of bringing the openings into register, or for moving them out of register with one another.

In particular, the invention relates to separable couplings for conducting fluids of the kind which comprise a pair of coupling parts each with a fluid flow passageway, the opening and closing of which is controlled by a slidable plate-like valve member moved to open position with respect to said passageway upon connection of the body parts and to closed position upon disconnection of the coupling parts, each said coupling part comprising a main body part defining a fluid flow passageway and presenting a guideway in which the plate-like valve member is mounted for rectilinear sliding motion with respect to an interior flat surface containing an opening at the inner end of said passageway and each slidable valve member having an opening adapted to be brought into register with said passageway opening upon connection of the coupling parts and to be moved out of register with the passageway opening upon disconnection of the coupling parts, whereby an imperforate flat surface portion slidably engaged with respect to said body part surface serves to close said passageway opening in the disconnected condition of the coupling parts.

In connection with sliding valve plate couplings of the above kind, therefore, the opening and closing of the fluid flow passageways is attended with a relative sliding movement between said valve plate and body part surfaces and with a relative traversal movement between the openings in the two surfaces, one of which openings has to move across its companion opening during the opening and closing of the fluid passageways in the coupling parts, it being understood that means are provided interengageable between the body parts and the slidable valve plates during connection and disconnection of the coupling parts so as to constrain such relative sliding motion to take place.

Whereas in the known couplings of the above kind it is usual to employ a sealing ring (commonly known as an O ring) for the purpose of providing a fluid seal around the registered openings, the construction and arrangement of the sealing ring employed is such that the seal is only completely effective when the openings are in register and is not completely effective during the movement of the one opening across the other opening in the respective coupling part, such that leakage is likely to occur during such movement.

It is an important object of the present invention to provide a coupling construction of the above kind with an improved construction and arrangement of fluid seal, which is effective during connection and disconnection of the coupling parts as well as when the respective openings are in register with one another in the coupled condition of the coupling parts.

Further objects and advantages of the invention residing in the construction, arrangement and combination of parts will be more fully appreciated from a consideration of the following detail description of two practical forms of the invention, by way of example, with reference to the accompanying drawings in which:

Fig. 1 is a perspective view of a coupling assembly in accordance with the invention, with the coupled parts in the coupled condition and showing the interconnected slidable valve plates in dotted position, corresponding to the disconnectable condition of the coupling parts, Fig. 2 is a perspective view of the coupling parts in disconnected condition and positioned ready for them to be brought together for connection, Fig. 3 is an underneath plan view of the coupling part shown at the top of Fig. 2, the dotted lines showing the position of the slidable valve plate when slid to open up the fluid passageway in the coupled condition, Fig. 4 is a top plan view of the bottom coupling part as seen in Fig. 2 and showing the sliding valve plate in dotted position to correspond with the position of this plate when slid to open up the corresponding fluid passageway in the coupled condition of the coupling parts, Fig. 5 is a longitudinal section of Fig. 1, with the coupling parts coupled together and the valve plates in open position with respect to their respective fluid flow passages, Fig. 6 is a similar view to Fig. 5 but showing the coupling parts in position ready for disconnection and the fluid passageways closed by their respective valve plates, and Fig. 7 is a plan view of the fluid sealing ring assembly as employed on this coupling.

Referring to the drawings, and first to Figs. 1 to 7, the two separable coupling parts are indicated generally at 10 and 12, with the coupling part 10 comprising a body part 14 and an associated sliding valve plate 16 and the coupling part 12 comprising a body part 18 and an associated sliding valve plate 20.

The body part 14 is of rectangular shape, as shown, and on its underneath surface is formed with a guideway 22 open at each end and formed by side flanges 24 and inturned flanges 26, this guideway serving slidably to receive the valve plate 16, which valve plate is formed with side tongues 28 slidably retained in the guideways 22. The body part 14 is also formed with a hollow boss 30 presenting an opening 32 (Figs. 3, 5 and 6) to its flat interior surface 34, with respect to which surface 34 the flat interior surface 36 of the slide plate 16 is slidably engaged by the retention of this slide plate in the guideway 22. The hollow interoir of the boss 30 forms a fluid flow passageway 38, which passageway is shown at 40 as being interiorly screw-threaded for the attachment of a fluid conductor hose or pipe line (not shown). The body part 14 is also formed on its opposite sides 24, with opposed depending finger portions 41 defining guideways 42 (Figs. 2 and 3) for the sliding engagement and retention of the valve slide plate 20 of the other coupling part 12 in the manner to be described later.

The slide plate 16 of the body part 14 is formed with an opening 44, a projecting pin 46 and a finger actuator end portion 48. The opening 44 is capable of being brought into or out of register with the pasageway opening 32 by sliding the plate 16 backwards and forwards in its guideway 22.

The body part 18 of the other coupling part 12 is formed with a pair of spaced apart opposed side flanges 50 and 52 defining aligned guideways 54 in which the corresponding valve plate 20 is slidably retained, the body part 18 and the plate 20 having opposed flat surfaces 56 and 58, respectively, slidably engaged with respect to one another. The flanges 50 and 52 define gaps 60 into which the finger portions 41 on the other coupling body part 14 are capable of being fitted, with their guideways 42 aligned with the guideways 54. The slide plate 20 is formed in its longitudinal side edges with opposed recess 62 of a width corresponding to the width of the gaps 60 and fingers 41, whereby, when the slide plate 20 is in the disconnected position as seen in Figs. 2 and 4, these recesses, by being then located at the gaps 60, permit the fingers 40 to be fitted into the gaps 60 to fill the latter and align the guideways 54 and 42.

The body part 18 is formed with a hollow boss 63, which may be interiorly screw-threaded for the attachment of a fluid conductor hose or pipe line, and which presents an opening 64 to the flat inner surface 56 of this body part, with which surface the flat surface 58 of the slide 20 is slidably engaged to position an opening 70 in the slide plate in or out of register with the opening 64 of the fluid flow passageway 72 defined in the hollow boss 63. The slide part 20 is also formed with a circular recess 74 for engagement by the pin projection 46 on the other slide plate 16 and with a finger actuator portion 76.

It will be appreciated that the opening and closing of the passageways 38 and 72 involves movement of the slide plate openings 44 and 70 across the passageway openings 32 and 64, respectively. Accordingly, the problem is presented how to maintain a fluid seal between the surfaces 34, 36 and 56, 58 not only when the openings 32, 44 and 64, 70 are in register but also when the plate openings 44 and 70 are being moved across the passageway openings 32 and 64. This problem is solved by the provision and use of a fluid sealing means, which is indicated generally at 78 in Fig. 7, and includes a ring portion 80 and an elongated loop portion 82 extending from one side of the ring portion and defining an enclosure 84, the breadth of which is at least equal to the diameter of the ring portion 80, whereby, with the sealing ring portion 80 providing a fluid seal about the said openings, when in register, the extension 82 is able to maintain the fluid seal during movement of the one opening across the other opening since the valve plate openings 44 and 70 move within the confines of the elongated seal portion 82.

In Figs. 3, 5 and 6, the coupling body part 10 is shown fitted with a fluid sealing means according to Fig. 7, with the ring part indicated at 80 and the elongated loop part indicated at 82'. In Figs. 4, 5 and 6, the coupling body part 12 is also shown fitted with a fluid sealing means according to Fig. 7, with the ring part indicated at 80" and the elongated loop part indicated at 82".

43 indicates a sealing ring in the face of the slide plate 20 for sealing around the inner ends of the slide plate openings 44 and 70.

To assemble the coupling parts 10 and 12 for coupling together, with the parts as positioned in Fig. 2, it is merely necessary to move the two parts upon each other so that the finger portions 41 enter the gaps 60 and the pin 46 engages the recess 74. With the parts thus positioned upon one another, as illustrated in Fig. 6, the guideways 42 on the coupling part 10 are aligned with the guideways 54 on the coupling part 12. Also, the openings 44 and 70 in the two slides 16 and 20, respectively, are in register with respect to one another but are out of register with respect to the openings 32 and 64 on their respective body parts. To complete the coupling operation, with the parts as seen in Fig. 6, it is then merely necessary to exert pressure on the portion 76 to move the slides 16 and 20 to the right, as seen in Fig. 6, it being appreciated that these slides are now united for unitary movement by the engagement of the pin 46 in the recess 74. This movement of the united slides 16 and 20 to the right causes the slide 20 to slide within guideways 42 so that portions of the slide 20 become located within these guideways when the part 76 is brought to rest against the left hand end of the assembled body parts, as seen in Fig. 5. In this position the openings 44 and 70 in the slides will have been brought into register with the openings 32 and 64 on their respective body parts and the coupling parts will be thus held coupled together with their valve slides 16 and 20 in the open position. In such position, the coupling parts are positively prevented from being separated by movement in the direction of the central longitudinal axis of the registered openings and fluid flow passages, since the two slide valves 16 and 20 are held locked together within the guideways 42 and 54.

To uncouple the parts it is merely necessary to exert pressure against the actuator portion 48, as seen in Fig. 5, to push the united slide valves 16 and 20 to the left, as seen in this figure. This automatically restores the slide valves to the valve closed position as seen in Fig. 6 and by positioning the slots 62 in the slide plate 20 opposite the gaps 60 frees this slide plate from the guideway 42 and enables the projections 41 to be moved laterally out of the gaps 60, with an attendant lateral separation of the two coupling parts 10 and 12. The construction and operation is such that the valve plates are positively moved to the open and closed positions consequent upon the actuators 76 and 48 being actuated to connect and disconnect the coupling parts, respectively. When the coupling parts are positioned for disconnection as shown in Fig. 6 the two valve plates 16 and 20 are in their closed positions and must be in their fully closed positions, as seen in Fig. 2, in order that the coupling parts may be again moved upon one another for the next coupling operation. Also, during the sliding movement of the slide plates 16 and 20 the sealing means 80', 82' and 80", 82" will function to maintain a permanent seal, due to the existence of their elongated loop portions 80' and 80".

Having thus described my invention what I claim as novel and wish to secure by Letters Patent is as follows:

A separable fluid coupler comprising a pair of separable coupling parts each having a body part and a flat sliding valve plate supported for sliding movement in said body part, said plates having opposed surfaces engaging with each other, interlocking means on said plates for causing said plates to slide as a unit relative to said body parts, first openings defined in said plate and in register with each other with said plates interlocked, a seal ring disposed between said plates and embracing and sealing the passage through said plates defined by the said openings, spaced flat opposed surfaces on said body parts having axially aligned second openings defined therein and between which said plates slide as a unit, sealing rings carried by said flat surfaces of said body parts, said rings having an annular portion embracing said second openings and sealing against the outer surfaces of said plates to seal said second openings with said first openings out of register with said second openings and said body parts separated, said seal rings having extension portions for embracing and sealing said first openings, said plates being slidable as a unit to interlock said body parts and to bring said first openings in register with said second openings to provide a passage through said body parts with leakage between said plates and said body parts being prevented by said sealing ring and said sealing rings.

References Cited in the file of this patent

UNITED STATES PATENTS

| | | |
|---|---|---|
| 1,947,453 | Bailey | Feb. 20, 1934 |
| 2,125,334 | Dempsey | Aug. 2, 1938 |
| 2,271,138 | Hamer | Jan. 27, 1942 |
| 2,399,516 | Snyder | Apr. 30, 1946 |
| 2,399,525 | Waag | Apr. 30, 1946 |
| 2,403,620 | Snyder | July 9, 1946 |

FOREIGN PATENTS

| | | |
|---|---|---|
| 510,794 | Belgium | May 15, 1952 |

OTHER REFERENCES

Victor Gasket Guide Catalogue, issued April 11, 1936, by Victor Mfg. and Gasket Co., Chicago, Ill.